Figure 1:
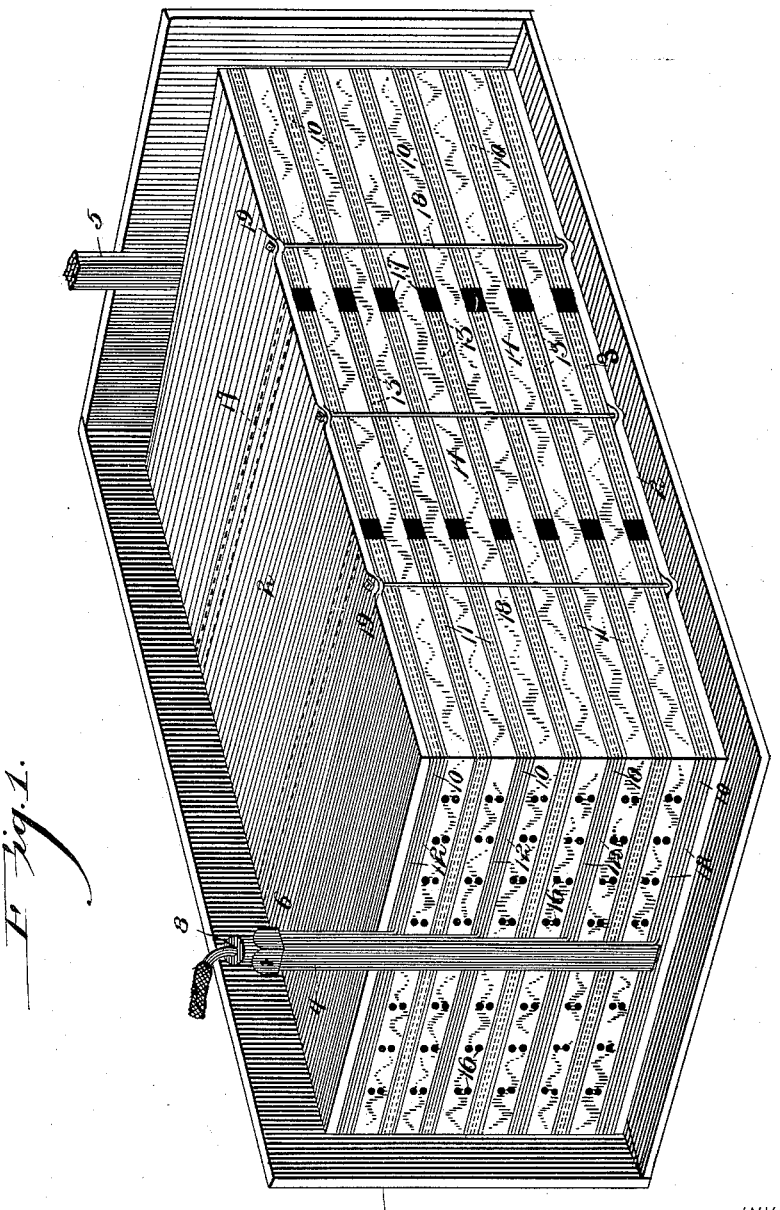

No. 608,714. Patented Aug. 9, 1898.
J. D. RIVELY.
STORAGE BATTERY.
(Application filed June 9, 1897.)
(No Model.) 2 Sheets—Sheet 2.
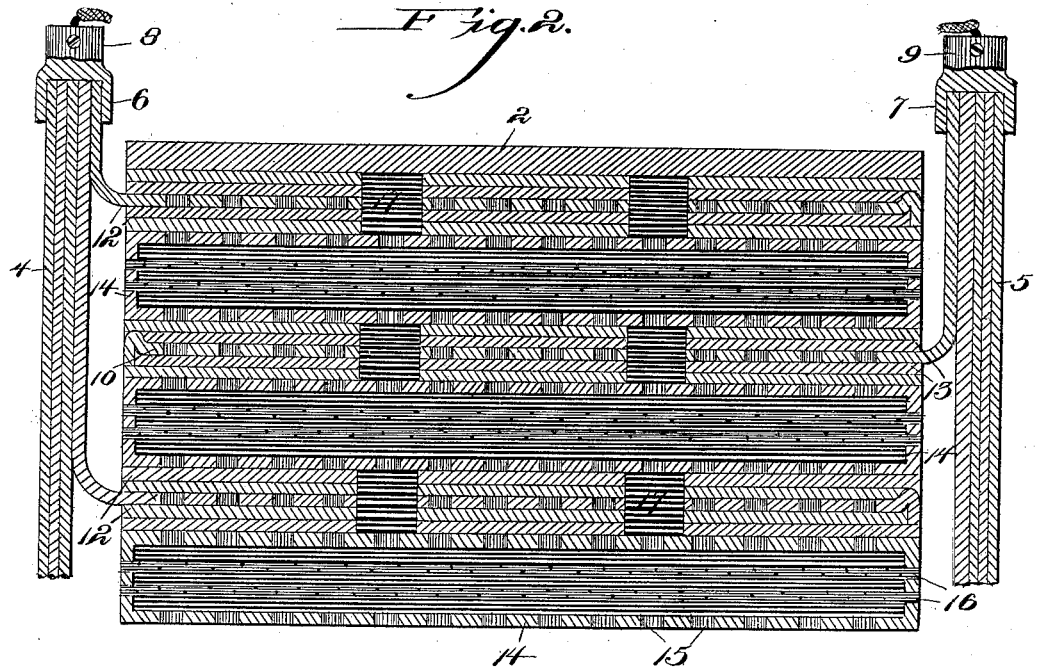
Fig. 2.
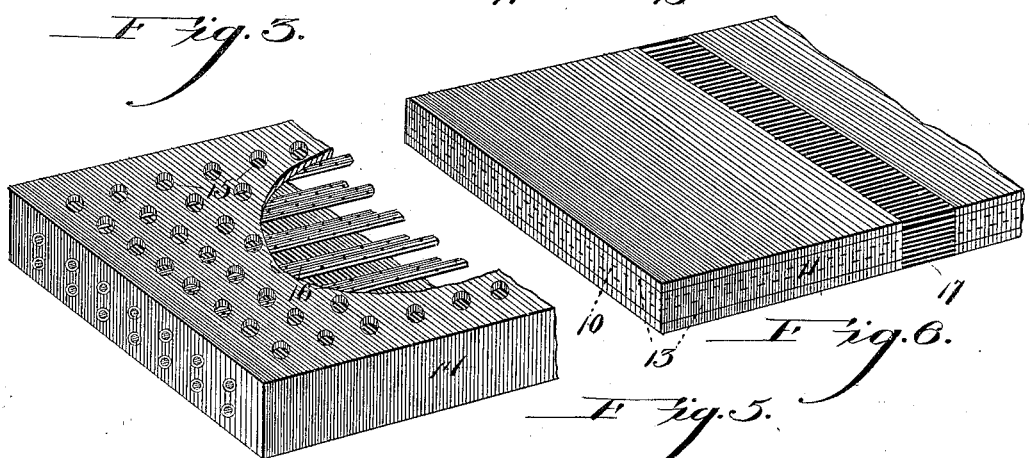
Fig. 3.
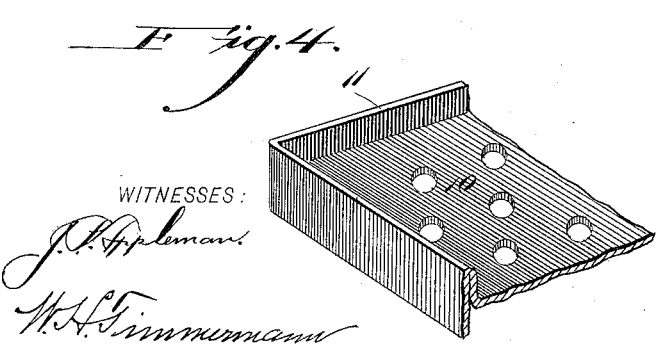
Fig. 5.
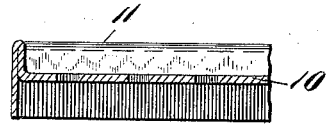
Fig. 6.
Fig. 4.
WITNESSES:
J. Appleman
W. H. Timmermann
INVENTOR
J. D. Rively
BY
Henry C. Evert
ATTORNEY.
THE NORRIS PETERS CO., PHOTO-LITHO., WASHINGTON, D. C.

United States Patent Office.

JOHN D. RIVELY, OF PITTSBURG, PENNSYLVANIA.

STORAGE BATTERY.

SPECIFICATION forming part of Letters Patent No. 608,714, dated August 9, 1898.

Application filed June 9, 1897. Serial No. 639,936. (No model.)

*To all whom it may concern:*

Be it known that I, JOHN D. RIVELY, a citizen of the United States of America, residing at Pittsburg, in the county of Allegheny and State of Pennsylvania, have invented certain new and useful Improvements in Storage Batteries, of which the following is a specification, reference being had therein to the accompanying drawings.

This invention relates to certain new and useful improvements in storage batteries, and has for its object to construct a battery capable of storing the electrical energy generated therein, so as to produce a great amount of power and permitting the practical use of the battery for propulsion purposes or for light or heat, as may be desired.

Briefly described, the invention consists in an outer box or casing having a series of positive and negative plates arranged therein and provided with a fiber or other suitable backing, which serves to form a spongy substance to retain the acid stored in same and, further, serves to keep the plates in a moist state.

Arranged between each positive and negative plate are boxes having perforated sides and ends and provided with perforated conducting-pipes for the acid, these boxes serving as a means for conducting the active material from one cell to the other and forming a means for the escape of gas or air during the charging or discharging of the battery, and, further, serving as a support between the positive and negative plates.

The invention therefore resides in the novel construction, combination, and arrangement of parts to be hereinafter more specifically described, and particularly pointed out in the claims.

In describing the invention in detail reference is had to the accompanying drawings, forming a part of this specification, and wherein like figures of reference indicate similar parts throughout the several views, in which—

Figure 1 is a perspective view of my improved battery with the outer box or casing shown in dotted lines. Fig. 2 is a longitudinal sectional view. Fig. 3 is a perspective view of one of the perforated conducting-boxes. Fig. 4 is a perspective view of a portion of one of the positive plates. Fig. 5 is a longitudinal sectional view of the same; and Fig. 6 is a perspective view of one of the series of layers, showing the cross-piece in position.

Referring now to the drawings by reference-figures, 1 denotes the outer box or casing, which is preferably composed of hard rubber and entirely surrounds the battery, which is composed of a series of perforated boxes and of layers of active and non-active material. On the bottom of the box or casing is placed a plate or layer of hard rubber 2 and has placed thereon a layer 3, of asbestos fiber or other suitable material, which serves to form a spongy substance to retain the acid stored therein, and by reason of its holding the liquid keeps the plates in a moist state and also assists in strengthening the battery to prevent the same from buckling. The positive poles 4 and the negative poles 5 are arranged at opposite sides of the box and unite in saddles 6 and 7, having binding-posts 8 and 9, these poles being terminations of the perforated plates 10, composed of conducting material and provided with a flange 11, extending on each side of the plate, which serves to hold the layer of red lead 12 in engagement with the plate for the positive and the layer of litharge 13 in engagement with the plate for the negative pole. Arranged between the perforated plates 10 are a series of boxes 14, which may be composed of hard rubber or other suitable material and provided on their sides and ends with a series of perforations 15 and having extending longitudinally therethrough a series of perforated pipes 16 and secured in perforations 15. The layers of rubber, asbestos, red lead, and litharge are divided throughout the battery by means of cross-pieces 17, composed of hard rubber or other suitable material.

The perforated boxes 14, arranged throughout the battery, serve as a feeder to conduct the active material from one cell to the other and form a means for the escape of gas, air, or fumes arising from the solution of the battery during the charging or discharging of the same. These boxes further serve to give a free circulation to the acids and form a support between the positive and negative poles. The solution being in direct contact with the perforated pipes, which are secured in the perforated boxes, serves, in connection with the pipes, to conduct the current generated from one cell to another, which would otherwise be cut off by the rubber cross-pieces. These cross-pieces serve to divide the material compassing the battery into several compartments, forming cells and bringing the battery to a higher state of efficiency by cutting off the active material, making separate sections of the same.

By means of the flanges 11, formed on the perforated plates composing the conducting material, the red-lead and litharge layers are held firmly in position on the plates and prevented from moving, which might be caused by the action of the acid.

The layers of material are bound firmly together by means of rubber bolts 18, engaging the upper and lower plates 2 through lips 19, formed on the same, permitting sufficient movement of the layers to prevent buckling or bursting of the battery by the action of the acids.

It will be noted that various changes may be made in the details of construction without departing from the general spirit of my invention.

Having fully described my invention, what I claim as new, and desire to secure by Letters Patent, is—

1. A storage battery, consisting of a series of layers of fiber, oxid of lead, and plates of conducting material, said plates terminating in the positive and negative poles, and a series of perforated boxes between said layers, said boxes having perforated pipes extending through the same, substantially as shown and described.

2. A storage battery consisting of a series of perforated boxes, and of layers of fiber, oxid of lead, and plates of conducting material, said plates terminating in positive and negative poles, substantially as shown and described.

3. In a storage battery a suitable casing, having therein a series of layers of fiber, oxid of lead, and plates composed of conducting material and a series of perforated boxes between the plates of conducting material, substantially as shown and described.

In testimony whereof I affix my signature in presence of two witnesses.

JOHN D. RIVELY.

Witnesses:
   A. M. WILSON,
   THOS. M. BOYD, Jr.